United States Patent
Schnapp et al.

(10) Patent No.: US 8,019,937 B2
(45) Date of Patent: Sep. 13, 2011

(54) APPLYING STORAGE DEVICE COMMIT-CACHED-DATA-TO-MEDIA FUNCTIONALITY TO IMPROVE DATA SECURITY IN SYSTEMS THAT ALLOW STORAGE DEVICES TO CACHE WRITES

(75) Inventors: Michael Gordon Schnapp, Banqiao (TW); Ching-Hai Hung, Yonghe (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 813 days.

(21) Appl. No.: 11/184,782

(22) Filed: Jul. 20, 2005

(65) Prior Publication Data
US 2006/0020752 A1    Jan. 26, 2006

Related U.S. Application Data

(60) Provisional application No. 60/521,926, filed on Jul. 21, 2004.

(51) Int. Cl.
*G06F 12/08* (2006.01)
(52) U.S. Cl. .................. 711/113; 711/E12.019
(58) Field of Classification Search .......... None
See application file for complete search history.

(56) References Cited

U.S. PATENT DOCUMENTS

| | | | | |
|---|---|---|---|---|
| 5,544,345 A * | 8/1996 | Carpenter et al. | ........ | 711/150 |
| 5,749,091 A * | 5/1998 | Ishida et al. | ........ | 711/135 |
| 5,761,705 A * | 6/1998 | DeKoning et al. | ........ | 711/113 |
| 5,829,030 A * | 10/1998 | Ishida et al. | ........ | 711/135 |
| 6,070,232 A * | 5/2000 | Ishida et al. | ........ | 711/143 |
| 6,922,754 B2 * | 7/2005 | Liu et al. | ........ | 711/138 |
| 7,234,021 B1 * | 6/2007 | Chilton | ........ | 711/113 |
| 2004/0117441 A1 * | 6/2004 | Liu et al. | ........ | 709/203 |
| 2006/0143407 A1 * | 6/2006 | Humlicek | ........ | 711/143 |

* cited by examiner

*Primary Examiner* — Matt Kim
*Assistant Examiner* — Ryan Dare
(74) *Attorney, Agent, or Firm* — Muncy, Geissler, Olds & Lowe, PLLC

(57) ABSTRACT

A method for committing cached data to storage media including a host entity and a physical storage device (PSD), comprising: the host entity issuing a write IO request to the PSD being in write-back caching mode to write data from a host memory to the PSD; the host entity receiving a successful IO completion response associated with the write IO request from the PSD and recording an entry of the write IO request to a selected list; the host entity issuing a synchronized cache IO request to the PSD; the PSD responding a successful IO completion response of the synchronized cache IO request to the host entity; the host entity extracting the entry of the write IO request from the selected list before issuing the synchronized cache IO request; and the host entity engaging completion processing of write IO request corresponding to the entry of the write IO request extracted.

34 Claims, 10 Drawing Sheets

A: the appropriate time for issuing the synchronize cache IO request
B: the synchronize cache IO request issuing time
C: the successful synchronize cache IO request completion response receiving time A: the appropriate time for issuing the synchronize cache IO request
B: the successful synchronize cache IO request issuing time
C: the successful synchronize cache IO request completion response receiving time

APPLYING STORAGE DEVICE COMMIT-CACHED-DATA-TO-MEDIA FUNCTIONALITY TO IMPROVE DATA SECURITY IN SYSTEMS THAT ALLOW STORAGE DEVICES TO CACHE WRITES

CROSS-REFERENCE TO RELATED APPLICATION

This application claims the priority benefit of U.S. Provisional Application Ser. No. 60/521,926, filed Jul. 21, 2004, the full disclosures of which are incorporated herein by reference.

BACKGROND OF THE INVENTION

1. Field of the Invention

The present invention relates to storage virtualization. More particularly, the present invention relates to redundant arrays of independent disks (RAID) storage virtualization.

2. Description of the Related Art

Storage virtualization is a technology that has been used to virtualize physical storage by combining sections of physical storage devices (PSDs) into logical storage entities, herein referred to as logical media units that are made accessible to a host system. This technology has been used primarily in redundant arrays of independent disks (RAID) storage virtualization, which combines smaller physical storage devices into larger, fault tolerant, higher performance logical media units via RAID technology.

A logical media unit, abbreviated LMU, is a storage entity whose individual storage elements (e.g., storage blocks) are uniquely addressable by a logical storage address. One common example of a LMU is the presentation of the physical storage of a HDD to a host over the host IO-device interconnect. In this case, while on the physical level, the HDD is divided up into cylinders, heads and sectors, what is presented to the host is a contiguous set of storage blocks (sectors) addressed by a single logical block address. Another example is the presentation of a storage tape to a host over the host IO-device interconnect.

A Storage virtualization Controller, abbreviated SVC, is a device the primary purpose of which is to map combinations of sections of physical storage media to LMUs visible to a host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion. The host system could be a host computer or another SVC.

An External (sometimes referred to as "Stand-alone") Storage Virtualization Controller is a Storage Virtualization Controller that connects to the host system via an IO interface and that is capable of supporting connection to devices that reside external to the host system and, otherwise, operates independently of the host.

One example of an external Storage Virtualization Controller is an external, or stand-alone, direct-access RAID controller. A RAID controller combines sections on one or multiple physical storage devices (PSDs), the combination of which is determined by the nature of a particular RAID level, to form LMUs that are contiguously addressable by a host system to which the LMU is made available. A single RAID controller will typically support multiple RAID levels so that different LMUs may consist of sections of PSDs combined in different ways by virtue of the different RAID levels that characterize the different units.

Another example of an external Storage Virtualization Controller is a JBOD emulation controller. A JBOD, short for "Just a Bunch of Drives", is a set of PSDs that connect directly to a host system via one or more a multiple-device IO device interconnect channels. PSDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel.

Another example of an external Storage Virtualization Controller is a controller for an external tape backup subsystem.

A Storage Virtualization Subsystem (abbreviated SV subsystem, SV system, or, SVS) consists of one or more above-mentioned SVCs or external SVCs, and at least one PSD connected thereto to provide storage therefor.

Storage Virtualization commonly incorporates data caching to enhance overall performance and data throughput. This data caching typically consists of caching read data and caching write data. Caching write data can further be divided into write-back caching and write-through caching. In write-back caching, the response to the host that a write operation has completed is sent out as soon as the associated data is received by the SVC and registered into the cache. It is not committed to physical media until some later time. In write-through caching, the response to the host that a write operation has completed is delayed until after the associated data is completely committed to physical media.

Write-back caching, in general, has the benefit of improved performance. By responding to the host as soon as data arrives rather than waiting until it is committed to physical media, typically more host write IOs per unit time can be processed. Furthermore, by accumulating a large amount of data in the cache before actually committing it to physical media, optimization can be performed during the commit process. Such optimizations include reducing the number of write operations to the physical devices by grouping large quantities of data into single write operations and ordering the data thereby reducing physical device mechanical latencies.

Write-through caching has the benefit of improved data security. A sudden loss of power or a failing SVC, for instance, will not result in the loss of data. Under certain circumstances, such as when the write IO stream is sequential in nature and the SVCs are configured into redundant SV system, write-through caching may actually offer better performance. In such a SV system, to avoid data loss in the event of a failing SVC, write-back caching may be combined with inter-controller cached write data synchronization so that there is a backup of all uncommitted write data in the alternate controller in the redundant pair. The process of backing up write data to the alternate controller in real time as it comes in from the host may result in significant performance degradation. In this case, especially if the write IO stream is sequential in nature, write-through caching may actually yield better performance because it is not necessary to backup the data to the alternate controller to avoid data loss in the event of an SVC failure.

PSDs that connect to SV systems also commonly have data caches that have similar characteristics to those described above for storage virtualization. They typically support write-back data caching and write-through data caching. As with SV systems, write-back data caching typically exhibits significantly better performance under most circumstances than write-through data caching. This is especially true if the PSD only supports concurrent queuing and/or execution of a single IO at a time in which an IO must execute to completion and a response indicating such received from the PSD by the host entity before the host entity can send out the next IO request to the PSD. In such a circumstance with the PSD operating in write-through data caching mode, the PSD will wait until it commits the write data received in the IO request to the media before it responds to the host entity that the IO is complete. Each such IO will result in a set of mechanical latencies that accounts for most of the time it takes to execute the write IO request. In write-back data caching mode, as soon as data arrives from the host entity (e.g., the SV system) and is registered in the data cache, the PSD will respond to the host that the IO is complete allowing the host entity to immediately send the next IO request to the PSD for processing. The PSD can then accumulate write data in its cache to be committed together in a single flush operation without direct impact on the IO flow from the host entity. In this way, it can substantially reduce percentage of the time it takes to commit a unit of data that is associated with mechanical latencies because multiple media access operations and associated multiple sets of mechanical latencies are combined into a single media access operation and associated single set of mechanical latencies.

In an effort to achieve the performance characteristics of write-back caching while minimizing degradation to data security, SV systems commonly employ backup power sources (e.g., batteries) to continue supplying power to cache memory in the event of a primary power source failure until uncommitted cache data can be committed to non-volatile storage (e.g. PSDs). In one embodiment of this, the backup power source only supplies power to cache memory. In this embodiment, a failure in the primary power source will result in a loss of power to the PSDs. Any uncommitted data that resides in the PSDs data cache that is associated with write IO requests from the host entity that were processed in write-back caching mode would be lost as a result of the power loss. In order to avoid such data loss, SV systems that employ this type of data cache backup will typically operate with the PSDs operating in write-through caching mode.

In general, SV systems will typically assume that, once the PSD has returned a status that indicates that a write IO request has completed successfully, the data written to the PSD in the IO request is secure. Based on this assumption, the SV system may clear the data from its own cache and, if it is operating in write-through caching mode, respond to the host entity that its write IO request has completed successfully. If this assumption turns out to be a false one, then data loss could result because the data has been discarded under the assumption that it was securely stored to physical media by the PSD. In SV system applications in which data security is the primary concern, PSDs will typically be operated in write-through caching mode to make sure that this assumption is correct under any circumstance.

In addition to the data cache backup scenario discussed above in which data loss may result if the PSD is operated in write-back caching mode and a power loss occurs, there are other possible scenarios that may result in data loss when a PSD is operated in write-back caching mode. If a PSD discards its cached data when it is reset with power applied or the PSD is subject to malfunction such that it can only be restored to normal operating state by a power cycling, data loss could occur when the host entity performs certain operations that require it to reset the PSD or that trigger a malfunction in the PSD. An example of such an operation is when a SVC fails in a redundant SV system and the other SVC engages takeover procedures. If the failing SVC had control over a particular PSD when it failed, the PSD may have been left in an indeterminate state at the time of SVC failure from the point of view of the surviving SVC. To restore the PSD to a determinate state, it would typically reset the PSD. If, during the course of reset processing, the PSD were to discard uncommitted cached data, then data loss might occur. In some cases, the indeterminate state that the PSD is left in may be such that it is not be able to complete the reset processing and restore itself to a normal operating state. It may then be necessary to power cycle the PSD to restore the it to a normal operating state, and any uncommitted data residing in the PSD cache would be lost as a result.

SUMMARY OF THE INVENTION

From a performance perspective, it is often beneficial to operate PSDs in write-back caching mode. However, operating in such a mode may substantially increase the risk of data loss as described above. The current invention endeavors to achieve performance characteristics near to what operating PSDs in write-back caching mode can provide while keeping data security at a level commensurate with operating PSDs in write-through caching mode.

According to an embodiment of this invention, in the process for writing IO requests between a host entity and PSD, when the PSD responds to the host entity that a particular write IO request has completed successfully, the host entity does not immediately clear the copy of the data from its own cache or engage processing that would normally follow the successful completion of the write IO request. Rather, it adds a record of the successful write IO request completion to a list (referred to here as the Completion Pending PSD Cache Synchronization list).

In another embodiment of this invention, in the process for writing IO requests between a host entity and PSD, the host entity would queue up any new write IO requests pending completion of the synchronized cache IO request and wait for completion of any write IO requests currently in the process of execution before issuing the synchronized cache IO request to the PSD. After the host entity receives the synchronized cache IO request completion response, it would dequeue the queued IO requests for execution and continue normal execution of any new IO requests. In this case, the host entity can assume that data associated with all entries in the list at the time that it receives the synchronized cache IO request completion response has been securely stored to physical media.

According to a further embodiment of this invention, in the process for writing IO requests between a host entity and PSD, the host entity might maintain two lists, a first list for write IO requests that completed prior to issuance of the synchronized cache IO request and a second list for write IO requests that completed after the issuance of the synchronized cache IO request. When the host entity receives the synchronized cache IO request completion response, it can complete processing of IO requests associated with all the entries on the first list but must wait for the successful completion of the next synchronized cache IO request before completing the processing of IO requests associated with entries on the second list.

In a further embodiment, when the host entity issues a synchronized cache IO request prior to completion of a preceding one, if the host entity has issued the last write IO request that it has to issue for the time being and has received IO request completion responses for all write IO requests that it has issued and yet a synchronized cache IO request that was issued prior to the issuance of the last write IO request is still pending on the PSD. In this case, the host entity might issue a "final" synchronized cache IO request immediately without waiting for previously issued ones to complete. On receipt of the final synchronized cache IO request successful completion response, the host entity completes processing of all IO requests corresponding to entries on the write IO request completion list.

In a further embodiment, when the PSD cannot successfully commit all the data in its cache to media, a synchronized cache IO request may return a completion failed response. In this case, the write IO requests that are entered into the Completion Pending PSD Cache Synchronization list may be reissued to the PSD then the synchronized cache IO request reissued. It may not be enough to simply reissue the synchronized cache IO request without first reissuing the write IO requests for, in the process of executing the previous synchronized cache operation, data in the PSD cache may have been discarded even if it was not successfully committed to PSD media. If the synchronized cache operation fails again, the process could be repeated either until it finally succeeds or a maximum retry count is reached. At this point, alternate recovery procedures could be engaged or the retried write IO requests could be posted as having failed.

In a further embodiment, when the PSD returns a failed IO completion response of a synchronized cache IO request, an alternate recovery process to the one described above would be to reissue the write IO requests that are entered into the Completion Pending PSD Cache Synchronization list, this time in write-through caching mode, thereby eliminating the need to execute a synchronized cache IO request following the re-issuance of write IO requests. If the PSD does not support the specification of write-cache policy on a per IO basis, the entire PSD could be temporarily switched to write-through caching mode, either on a per write-IO-request-retry basis or for the entire course of the error recovery process, and write IO requests entered into the Completion Pending PSD Cache Synchronization list could then be retried. Successful completion of the write IO request would be an indication that the associated data was successfully committed to the PSD media. Alternately, each write IO request entered into the Completion Pending PSD Cache Synchronization list could be retried with the PSD still in write-back mode and, on completion, could be followed by a synchronized cache IO request that must complete before issuing the next write IO request to retry.

In a further embodiment, a mechanism incorporates the above-mentioned implementations by the following steps: (1) the host entity receives a completion failed response of a synchronize cache IO request; (2) the host entity determines whether the PSD supports write-through write cache policy; (3) the host entity determines whether the PSD support the specification of write-cache policy on a per IO basis.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Figure 1A:
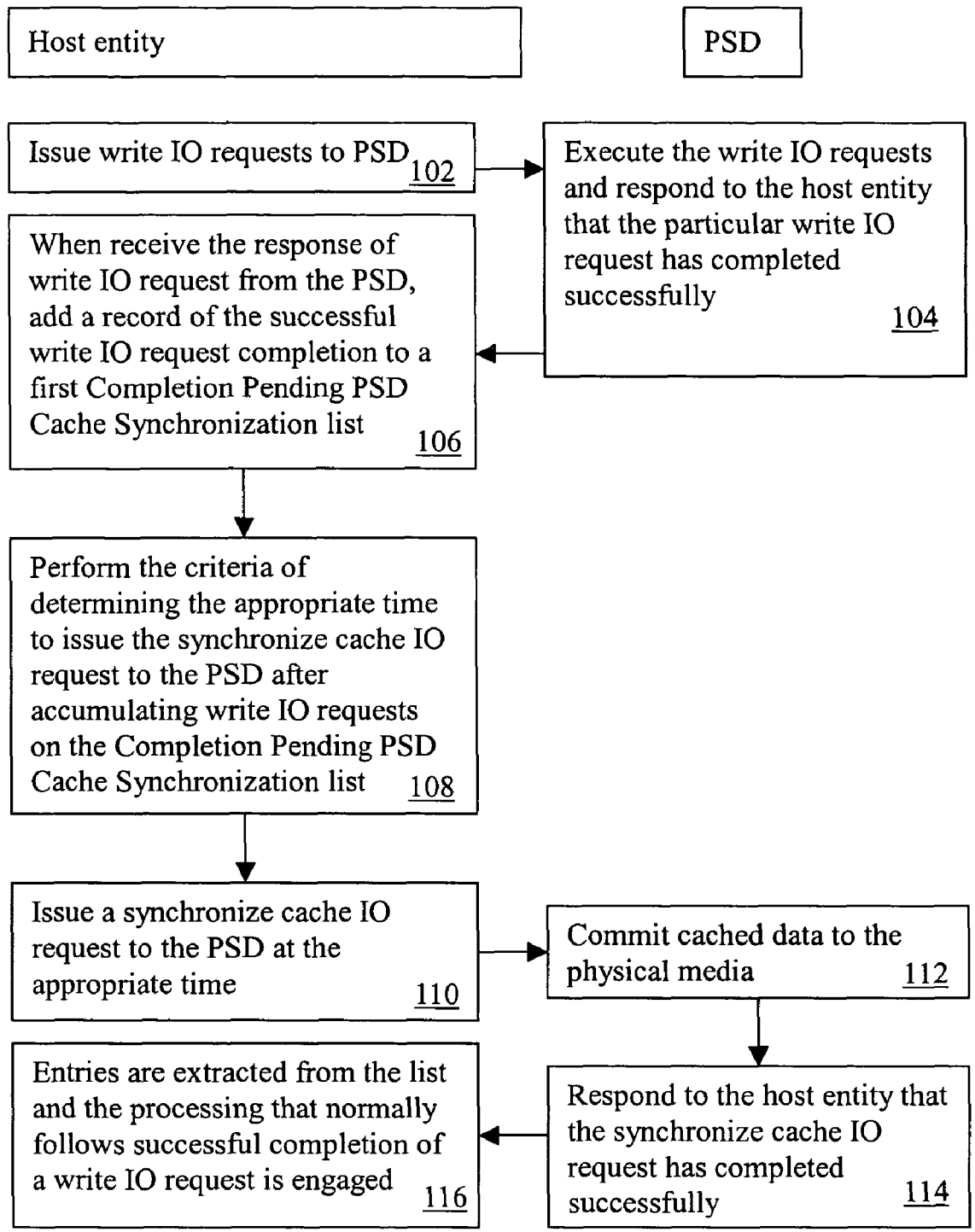
FIG. 1A is a flow chart illustrating the process for writing IO requests between a host entity and PSD according to an embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

The current invention endeavors to achieve performance characteristics near to what operating PSDs in write-back caching mode can provide while keeping data security at a level commensurate with operating PSDs in write-through caching mode.

To accomplish this, the host entity, which could be a SVC or a host computer, has the PSDs process write IO requests in write-back caching mode. FIG. 1A is a flow chart illustrating the process for writing IO requests between a host entity and PSD according to an embodiment of this invention comprising the following steps. The host entity issues write IO requests to PSD in step 102, and then PSD executes the write IO requests and respond to the host entity that the particular write IO request has completed successfully in step 104. When the PSD responds to the host entity that a particular write IO request has completed successfully and the host entity receives the response from the PSD in step 106, the host entity does not immediately clear the copy of the data from its own cache or engage processing that would normally follow the successful completion of the write IO request. Rather, it adds a record of the successful write IO request completion to a list (referred to here as the Completion Pending PSD Cache Synchronization list). This continues until it is deemed appropriate to complete the processing of some or all of the entries in the list. Then, the host entity performs the criteria of determining the appropriate time to issue the synchronize cache IO request to the PSD after accumulating write IO requests on the Completion Pending PSD Cache Synchronization list in step 108. The determination of when it is appropriate could be based on the number of entries in the list, the length of time entries spend on the list, the number of write IO requests there are left to issue to the particular PSD, etc. When it is deemed that entries on the list should be processed to completion, the host entity issues a synchronized cache IO request to the PSD in step 110 to have the PSD commit cached data to the physical media in step 112. After successful completion of the synchronized cache IO request, the PSD responds to the host entity that the synchronize cache IO request has completed successfully in step 114. Finally, entries are extracted from the list and the processing that normally follows successful completion of a write IO request that was put off at the time is now engaged in step 116. All entries that were added to the list before the issuance of the synchronized cache command can be extracted from the list and processing completed because, by responding that the synchronized cache completed successfully, the PSD has assured that any data that may have been transferred to the PSD as part of a write IO request that preceded the issuance of synchronized cache IO request is now securely stored on the physical media.

Figure 2A:
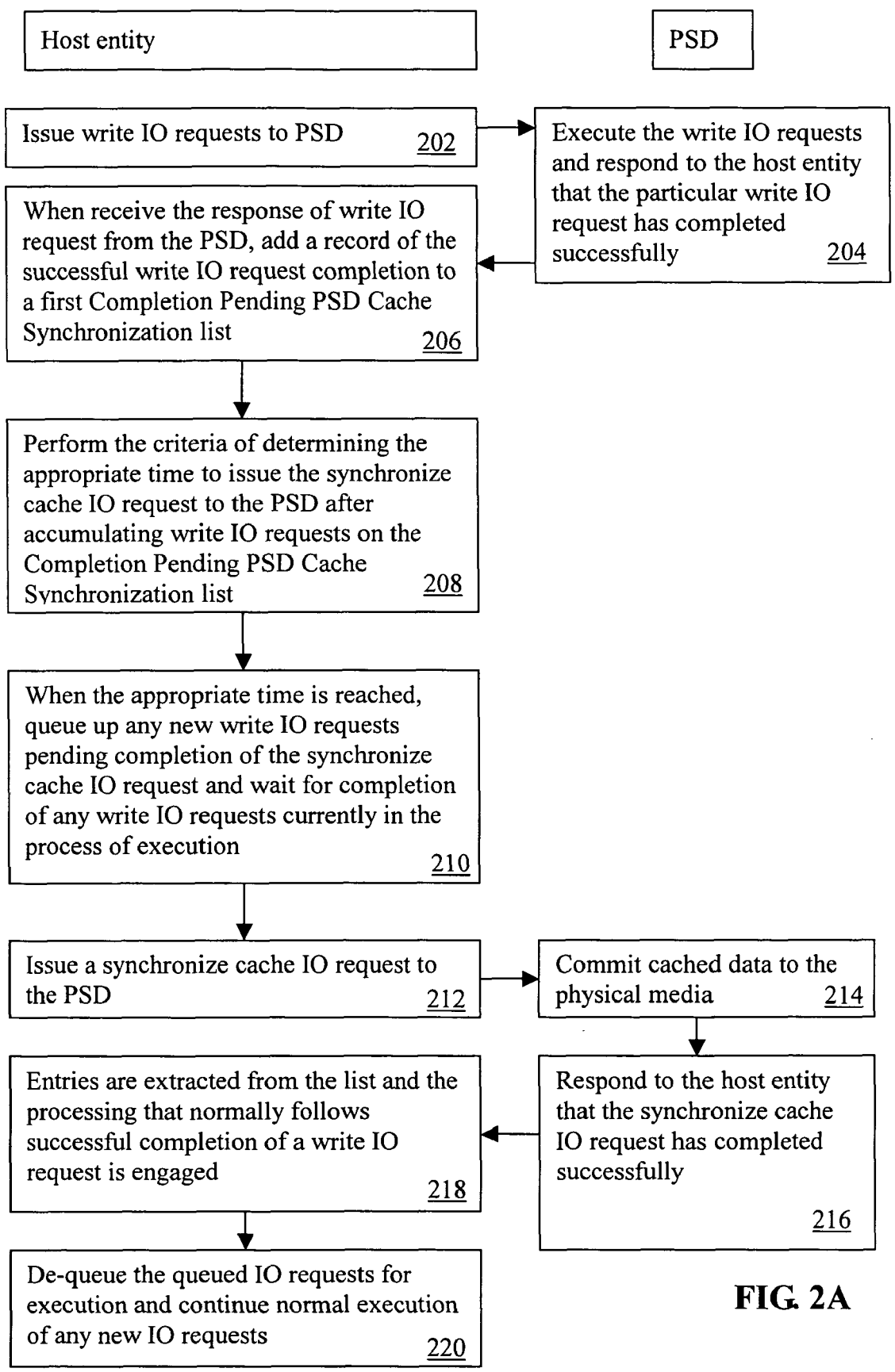
FIG. 2A is a flow chart illustrating the process for writing IO requests between a host entity and PSD according to another embodiment of this invention.

If the order in which the host entity receives the response that the synchronized cache command has completed successfully relative to responses that write IO requests have completed is guaranteed to be the same as the order in which they were executed (referred to here as deterministic IO execution ordering), then the host entity can extract entries corresponding to, and complete processing of, all write IO requests for which the host entity received a successful completion response prior to reception of the synchronized cache IO request completion response without any need for IO request ordering by the host entity. Otherwise, if the synchronized cache IO request may be executed in an order relative to other IO requests different from the order in which IO request completion responses are received by the host entity (referred to here as non-deterministic IO execution ordering), the host entity cannot assume that data associated with all write IO requests that completed prior to reception of the synchronized cache IO request response has been securely stored to physical media. The only thing it can assume is that data associated with all write IO requests that completed prior to issuance of the synchronized cache IO request to the PSD has been securely stored to physical media. Under these conditions, the host entity would typically adopt one of the following policies:

Please also refer to FIG. 2A, which is a flow chart illustrating the process for writing IO requests between a host entity and PSD according to another embodiment of this invention. To the beginning, the process goes the same steps 202 to 206 as steps 102 to 106 in the flow chart of FIG. 1A, and the host entity performs the criteria of determining the appropriate time to issue the synchronize cache IO request to the PSD after accumulating write IO requests on the Completion Pending PSD Cache Synchronization list in step 208. In step 210, the host entity would queue up any new write IO requests pending completion of the synchronized cache IO request and wait for completion of any write IO requests currently in the process of execution. Then, the host entity issues a synchronized cache IO request to the PSD in step 212 to have the PSD commit cached data to the physical media in step 214. After successful completion of the synchronized cache IO request, the PSD responds to the host entity that the synchronize cache IO request has completed successfully in step 216. When the host entity receives the synchronized cache IO request completion response and entries are extracted from the list and the processing that normally follows successful completion of a write IO request that was put off at the time is now engaged in step 218, the host entity would de-queue the queued IO requests for execution and continue normal execution of any new IO requests in step 220. In this case, the host entity can assume that data associated with all entries in the list at the time that it receives the synchronized cache IO request completion response has been securely stored to physical media.

Figure 2B:
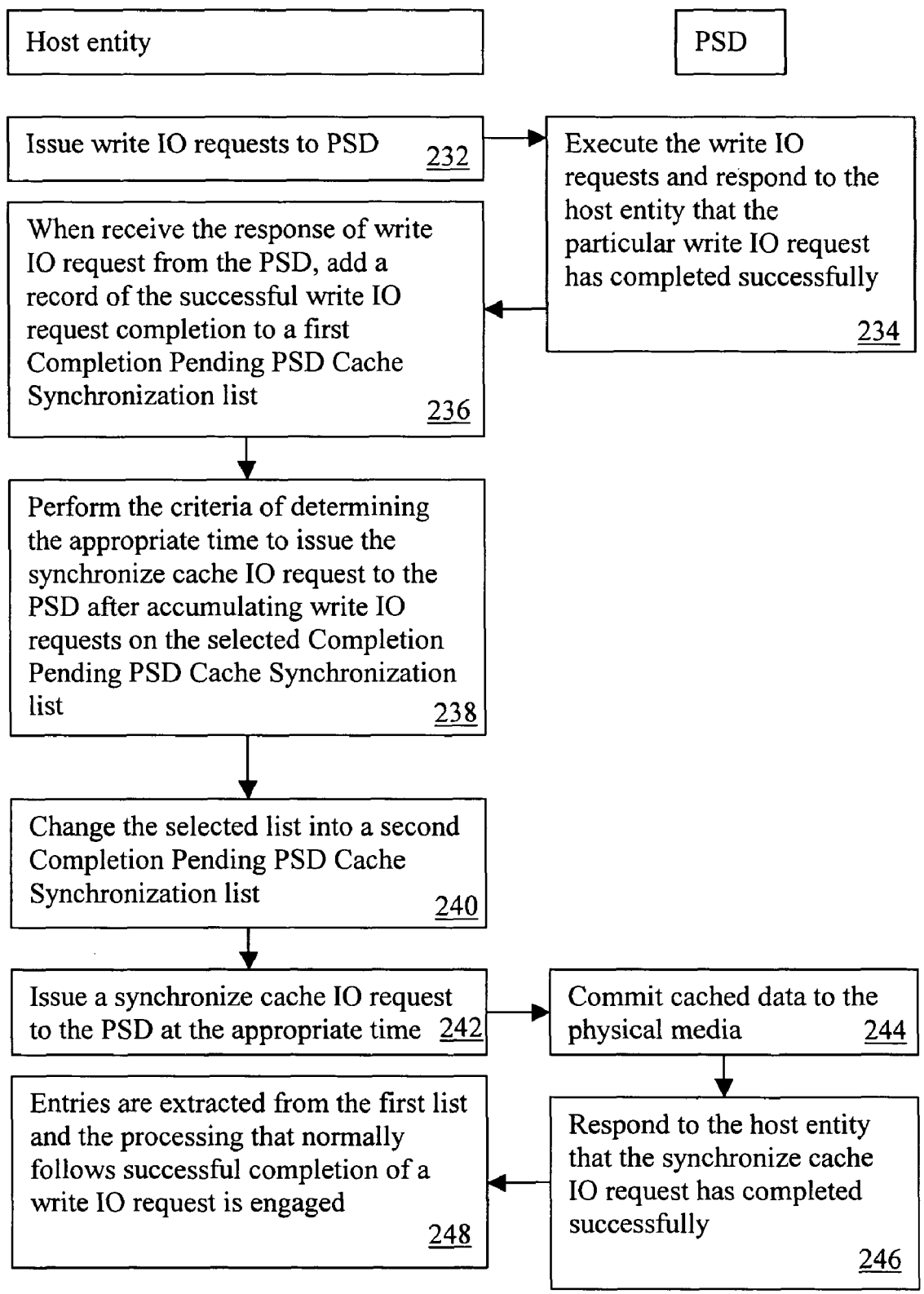
FIG. 2B is a flow chart illustrating the process for writing IO requests between a host entity and PSD according to a further embodiment of this invention.

Alternately, referring to FIG. 2B, which is a flow chart illustrating the process for writing IO requests between a host entity and PSD according to a further embodiment of this invention. Wherein, the process goes the same steps 232 to 238 as steps 202 to 208 in the flow chart of FIG. 2A and the same steps 242 to 246 as steps 212 to 216 in the flow chart of FIG. 2A. In the embodiment, the host entity might maintain two lists, a first list for write IO requests that completed prior to issuance of the synchronized cache IO request and a second list for write IO requests that completed after the issuance of the synchronized cache IO request. As shown in FIG. 2B, the host entity may change the selected list into a second Completion Pending PSD Cache Synchronization list in step 240. When the host entity receives the synchronized cache IO request completion response, it can complete processing of IO requests associated with all the entries on the first list but must wait for the successful completion of the next synchronized cache IO request before completing the processing of IO requests associated with entries on the second list. The host entity can extract all entries from the list in step 248.

Figure 1B:
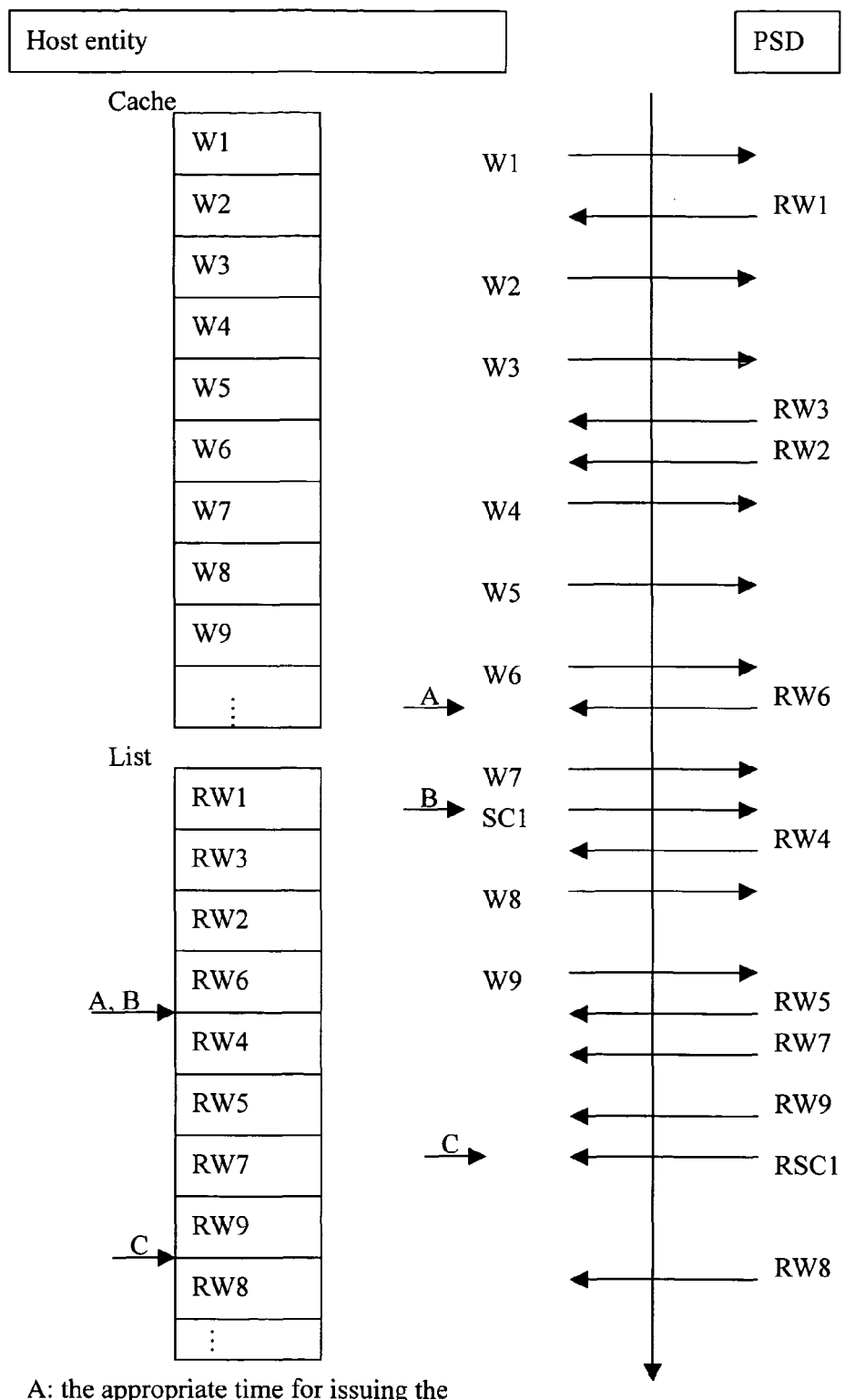
FIG. 1B is a diagram explaining a mechanism for writing IO requests between the cache and the list of a host entity and PSD according to FIG. 1A.

Please refer to FIG. 1B, an example to explain the process in FIG. 1A is shown. In FIG. 1B, "Wn" means the nth write IO request, "RWn" means the successful IO request completion response of "Wn", "SCn" means synchronized cache IO request, and "RSCn" means the successful IO request completion response of "SCn", in which n=1, 2, 3 . . . indicates the issuing order of IO requests of the same type. The arrows across the time line show the order of the IO requests and the corresponding IO request responses occurred. As can be seen, the IO requests W1 through W9 are issued from the host cache to PSD in an order different from that of the associated successful IO request completion responses. The synchronized cache IO request SC1 is issued after issuance of write IO requests W1 through W7 and receiving of successful IO request completion responses RW1 through RW3 and RW6, but before W8, W9 and RW4, RW5 and RW7. The successful IO request completion response RSC1 is received after W1 through W9 and RW1 through RW7 and RW9. For a deterministic IO execution ordering PSD, when RSC1 is received, W1 through W7 and W9 have been committed to the media because their corresponding response RW1 through RW7 and RW9 were received by the host entity prior to RSC1, while for a non-deterministic IO execution ordering PSD, when RSC1 is received, only W1 through W3 and W6 can be assured to have been committed to the media.

Figure 2C:
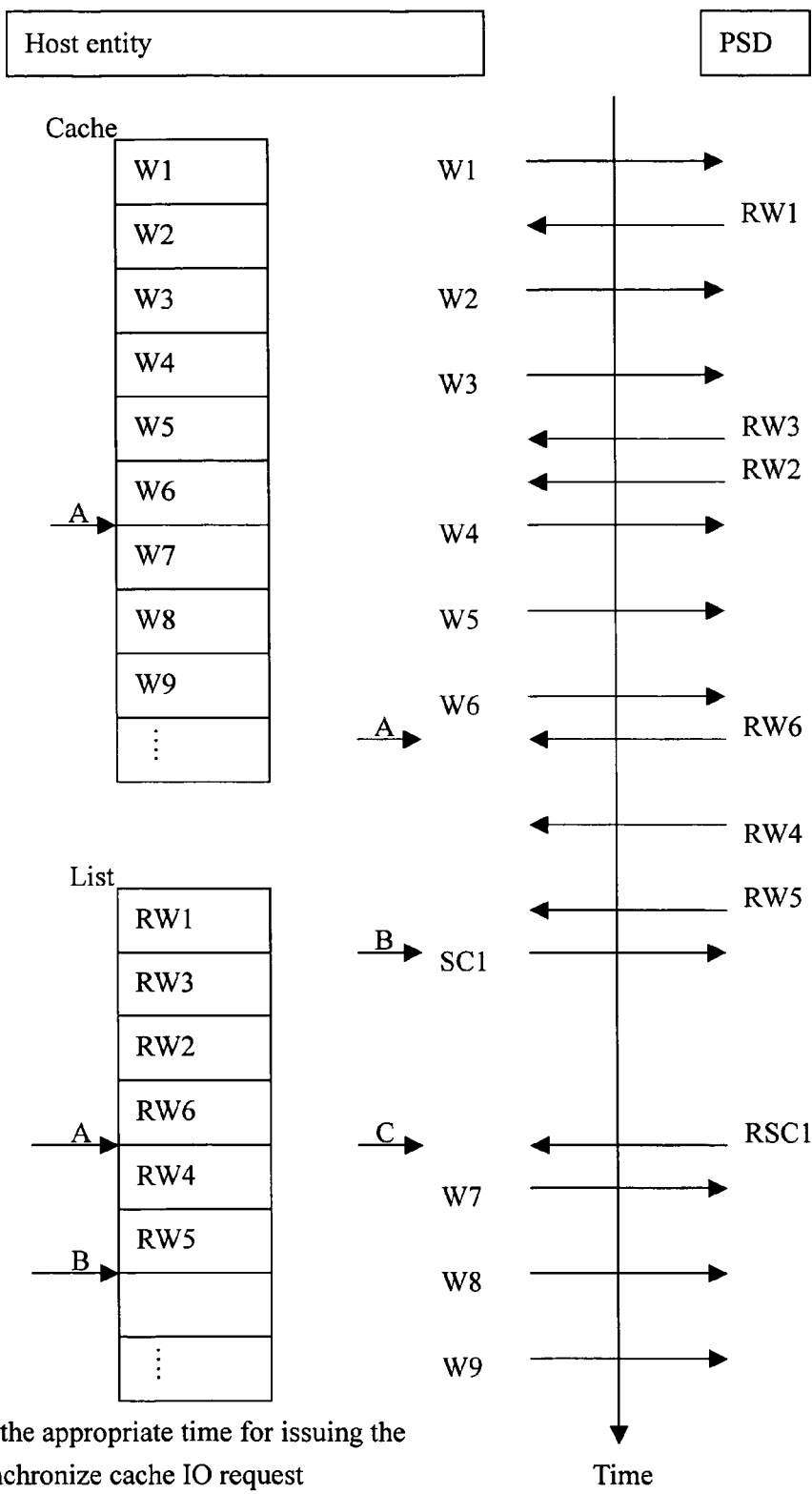
FIG. 2C is a diagram explaining a mechanism for writing IO requests between the cache and the list of a host entity and PSD according to FIG. 2A.

Please refer to FIG. 2C, in which an example to explain the process in FIG. 2A is shown. In FIG. 2C, after W6 is issued, an appropriate time "A" is found to issue SC1. Then the host entity queues up any new write IO requests pending completion of the synchronized cache IO request (W7-W9) and waits for completion of any write IO requests currently in the process of execution (W6, W4, W5) before issuing the synchronized cache IO request SC1. When RSC1 is received, W1 through W6 have been committed to the media because their corresponding response RW1 through RW6 were received by the host entity prior to RSC1. Then the host entity can extract all entries from the list. After the host entity receives the synchronized cache IO request completion response RSC1, it de-queues the queued IO requests (W7-W9) for execution and continue normal execution of any new IO requests.

Figure 2D:
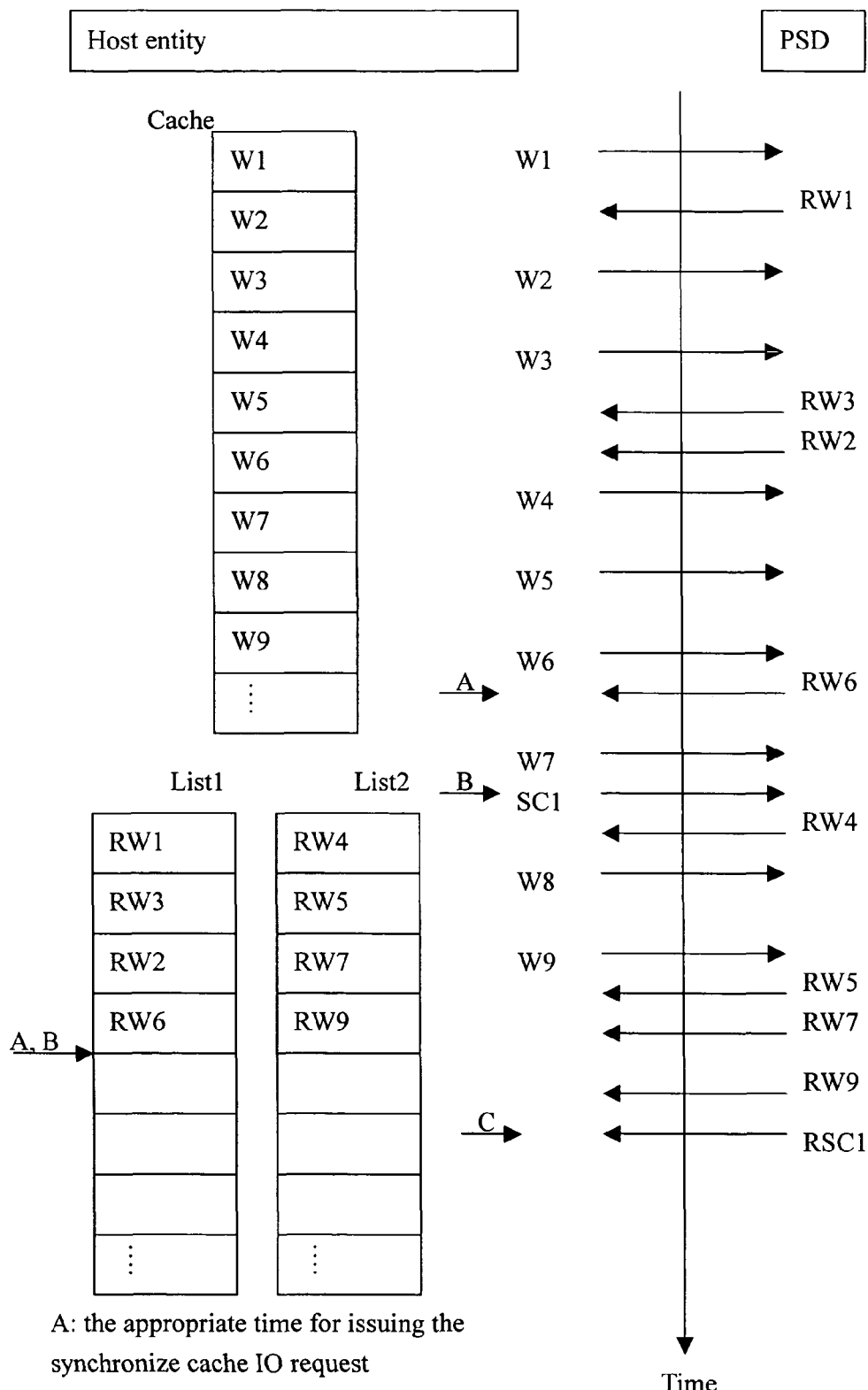
FIG. 2D is a diagram explaining a mechanism for writing IO requests between the cache and the lists of a host entity and PSD according to FIG. 2B.

Please refer to FIG. 2D, in which an example to explain the process in FIG. 2B is shown. In FIG. 2D, after W6 is issued, an appropriate time "A" is found to issue SC1. At this time, only RW1-RW3 and RW6 have been received and recorded on List1. RW4, RW5 and RW7 are received after SC1 is issued, and thus are recorded on List2.

Figure 3:
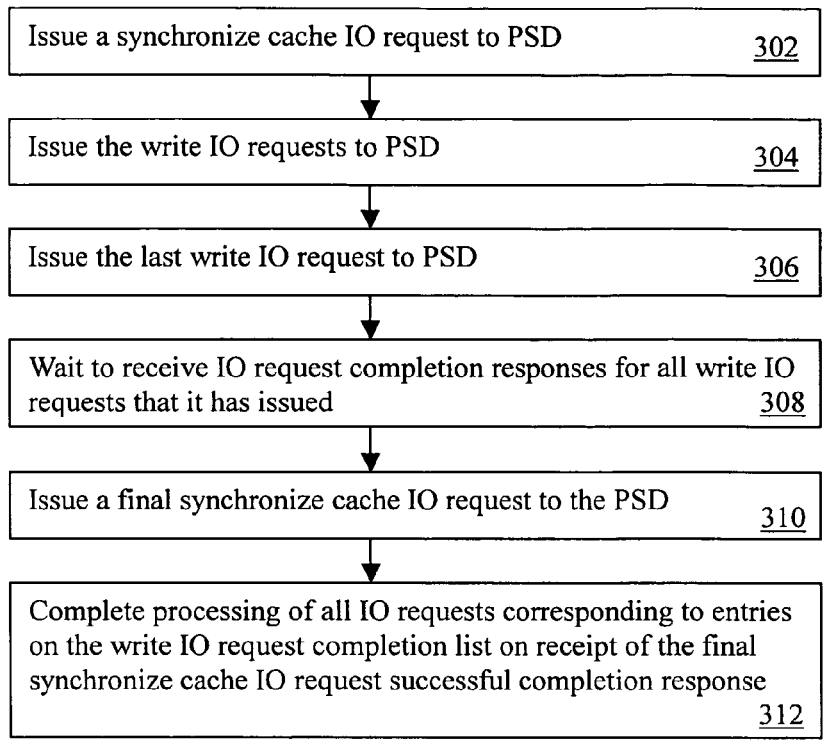
FIG. 3 is a flow chart illustrating the process for writing IO requests when the host entity issues a synchronized cache IO request prior to completion of a preceding one.

Note that there may be circumstances in which the host entity may issue a synchronized cache IO request prior to completion of a preceding one. Please refer to FIG. 3, which is a flow chart illustrating the process for writing IO requests when the host entity issues a synchronized cache IO request prior to completion of a preceding one. The process comprises the following steps: (1) the host entity issues a synchronize cache IO request to PSD in step 302; (2) the host entity issues the write IO requests to PSD in step 304; (3) the host entity issues the last write IO request to PSD in step 306; (4) the host entity waits to receive IO request completion responses for all write IO requests that it has issued in step 308; (5) the host entity issues a final synchronize cache IO request to the PSD in step 310; and (6) the host completes processing of all IO requests corresponding to entries on the write IO request completion list on receipt of the final synchronize cache IO request successful completion response in step 312. Such a case might be applied if the host entity has issued the last write IO request that it has to issue for the time being and has received IO request completion responses for all write IO requests that it has issued and yet a synchronized cache IO request that was issued prior to the issuance of the last write IO request is still pending on the PSD. In this case, the host entity might issue a "final" synchronized cache IO request immediately without waiting for previously issued ones to complete. On receipt of the final synchronized cache IO request successful completion response, the host entity completes processing of all IO requests corresponding to entries on the write IO request completion list.

Figure 4:
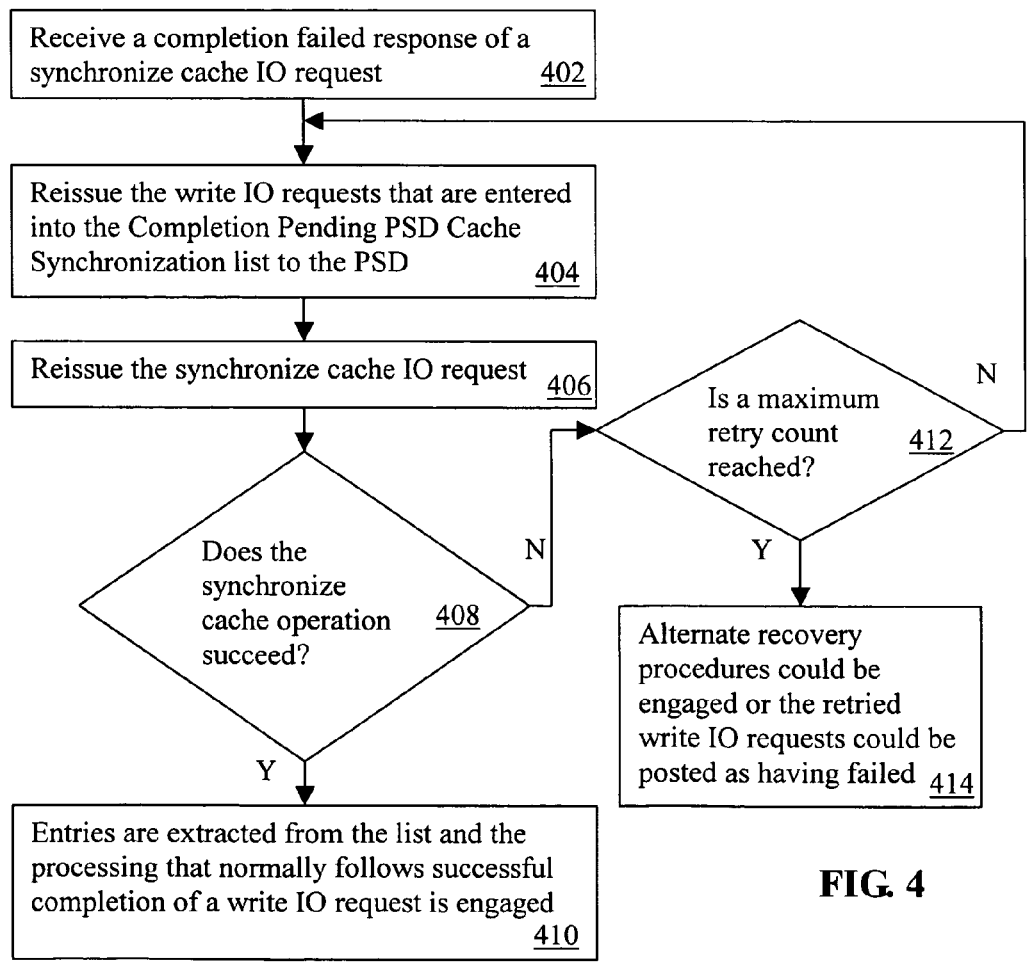
FIG. 4 is a flow chart illustrating the process for writing IO requests when the PSD cannot successfully commit all the data in its cache to media.

Please refer to FIG. 4, which is a flow chart illustrating the process for writing IO requests when the PSD cannot successfully commit all the data in its cache to media. Under certain circumstances, as when the PSD cannot successfully commit all the data in its cache to media, a synchronized cache IO request may return a completion failed response. Thus, the host entity receives a completion failed response of a synchronize cache IO request in step 402. In this case, the write IO requests that are entered into the Completion Pending PSD Cache Synchronization list may be reissued to the PSD in step 404 then the synchronized cache IO request reissued in step 406. It may not be enough to simply reissue the synchronized cache IO request without first reissuing the write IO requests for, in the process of executing the previous synchronized cache operation, data in the PSD cache may have been discarded even if it was not successfully committed to PSD media. The host entity determines whether the synchronize cache operation succeeds in step 408 and determines whether a maximum retry count is reached in step 412. If the synchronized cache operation fails again, the process could be repeated either until it finally succeeds or a maximum retry count is reached. At this point, alternate recovery procedures could be engaged or the retried write IO requests could be posted as having failed in step 414. If the synchronized cache operation succeeds, the entries are extracted from the list and the processing that normally follows successful completion of a write IO request is engaged in step 410.

FIGS. 5A-5D are the flow charts illustrating the process for writing IO requests when the PSD returns a failed IO completion response of a synchronized cache IO request.

Figure 5A:
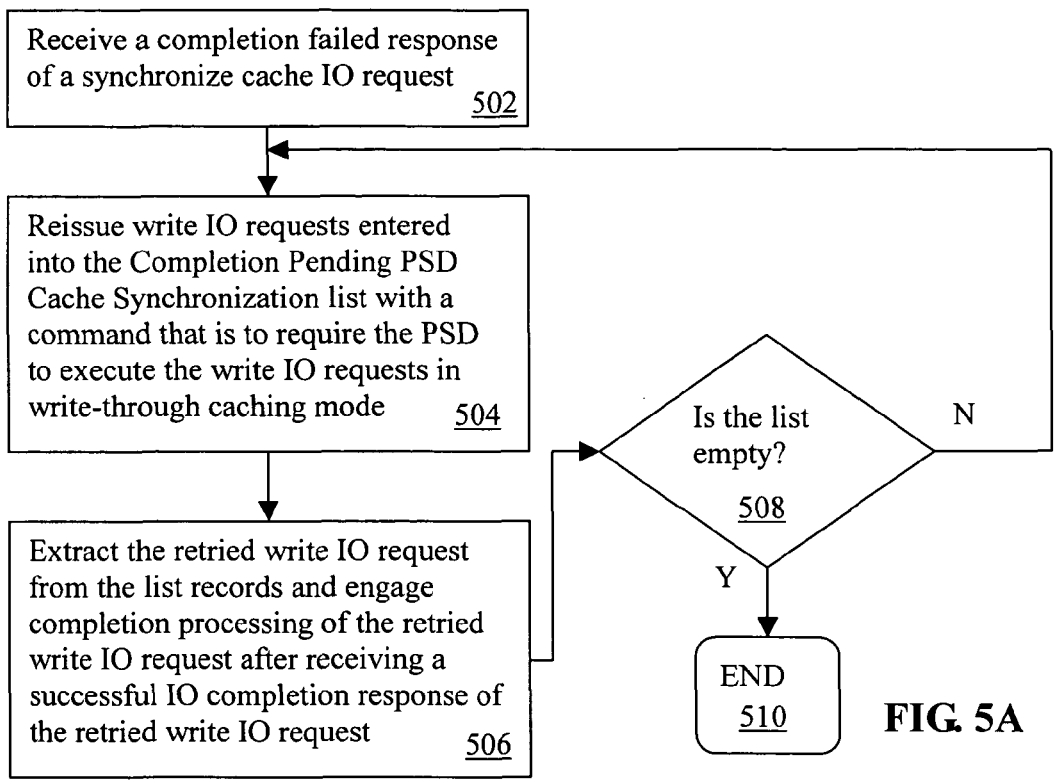
FIGS. 5A-5D are the flow charts illustrating the process for writing IO requests when the PSD returns a failed IO completion response of a synchronized cache IO request.

Please refer to FIGS. 5A, in the event the PSD returns an completion failed response to a synchronized cache IO request and the host entity receives the completion failed response of the synchronize cache IO request in step 502, an alternate recovery process to the one described above would be to reissue the write IO requests that are entered into the Completion Pending PSD Cache Synchronization list, this time in write-through caching mode in step 504, thereby eliminating the need to execute a synchronized cache IO request following the re-issuance of write IO requests. Then, the process goes to step 506 to extract the retried write IO request from the list records and engage completion processing of the retried write IO request after receiving a successful IO completion response of the retried write IO request. Finally, the process goes to step 508 to determine whether the list is empty. If the determination is "Yes", the process is finished in step 510.

Figure 5B:
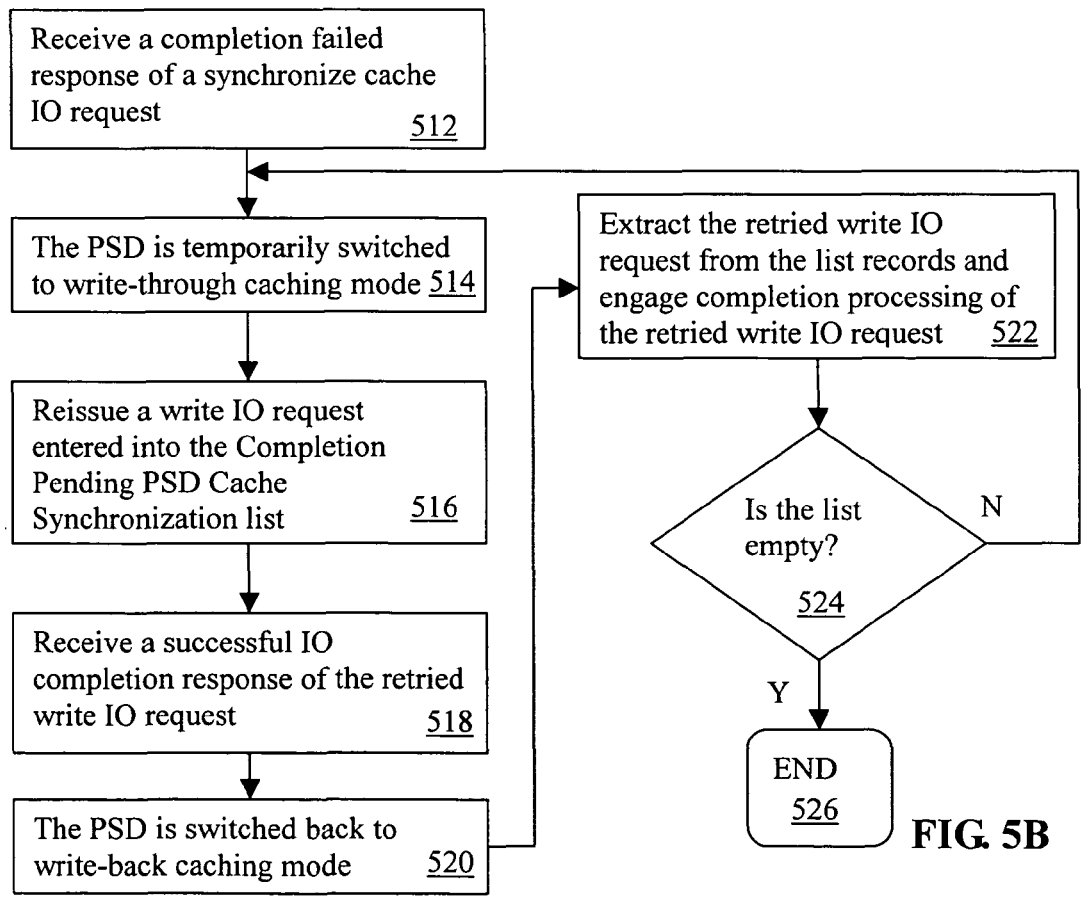
Figure 5C:
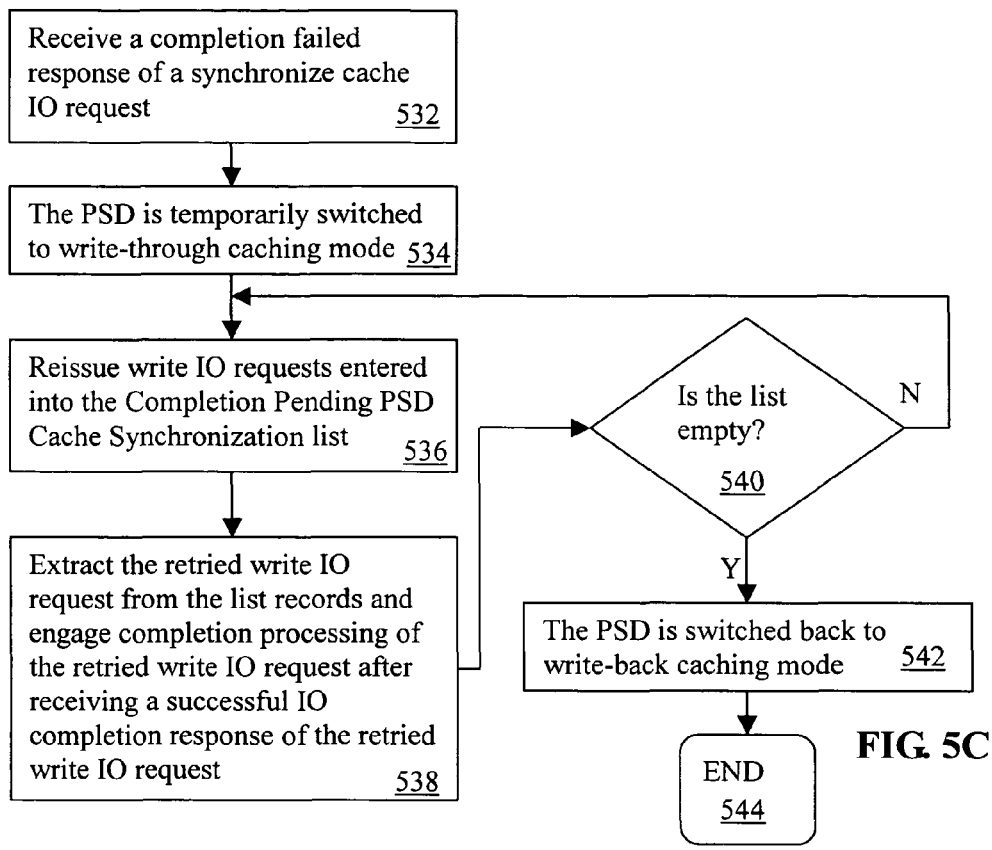
Figure 5D:
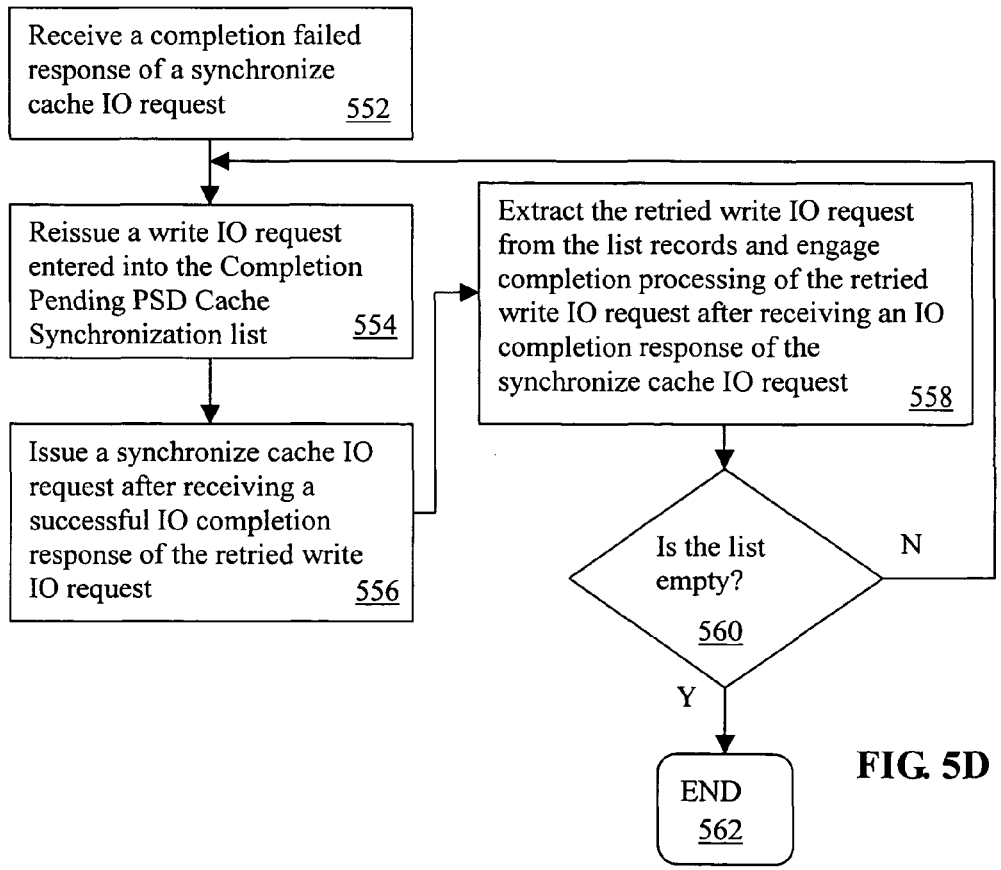

If the PSD does not support the specification of write-cache policy on a per IO basis, the entire PSD could be temporarily switched to write-through caching mode as step 514 depicted in FIG. 5B and step 534 of FIG. 5C, either on a per write-IO-request-retry basis as depicted in FIG. 5B, or for the entire course of the error recovery process as depicted in FIG. 5C, wherein write IO requests entered into the Completion Pending PSD Cache Synchronization list could then be retried, and successful completion of the write IO request would be an indication that the associated data was successfully committed to the PSD media. As shown in FIG. 5B, on a per write-IO-request-retry basis, the host entity reissues a write IO request entered into the Completion Pending PSD Cache Synchronization list in step 516. The PSD is switched back to write-back caching mode in step 520 after the host entity receives a successful IO completion response of the retried write IO request in step 518, and the host entity extracts the retried write IO request from the list records and engages completion processing of the retried write IO request in step 522. Then, the host entity determines whether the list is empty in step 540. If the determination is "No", the process goes to step 514, the PSD is switched to write-through caching mode. And the steps 514 to 524 are repeated until the list is empty. As shown in FIG. 5C, the entire PSD could be temporarily switched to write-through caching mode in step 534 for the entire course of the error recovery process. The host entity reissues write IO requests entered into the Completion Pending PSD Cache Synchronization list in step 536 and extracts the retried write IO request from the list records and engages completion processing of the retried write IO request after receiving a successful IO completion response of the retried write IO request in step 538. And the steps 536 and 538 are repeated until the list is empty. When the list is empty, the PSD is switched back to write-back caching mode in step 542.

Alternately, each write IO request entered into the Completion Pending PSD Cache Synchronization list could be retried with the PSD still in write-back caching mode and, on completion, could be followed by a synchronized cache IO request that must complete before issuing the next write IO request to retry. Please also refer to FIG. 5D, which comprises the following steps: (1) the host entity receives a completion failed response of a synchronize cache IO request in step 552; (2) the host entity reissues a write IO request entered into the Completion Pending PSD Cache Synchronization list in step 554; (3) the host entity issues a synchronize cache IO request after receiving a successful IO completion response of the retried write IO request in step 556; (4) the host entity extracts the retried write IO request from the list records and engage completion processing of the retried write IO request after receiving an IO completion response of the synchronize cache IO request in step 558. If the IO completion response of the synchronize cache IO request indicates failure of the synchronize cache IO request, the retried write IO request is posted as having failed; (5) the host controller determines whether the list is empty in step 560 and repeats the steps 554 to 560 until the list is empty. In this case, successful completion of a synchronized cache IO request would be an indication that data associated with the preceding write IO request was successfully committed to the PSD media.

Figure 6:
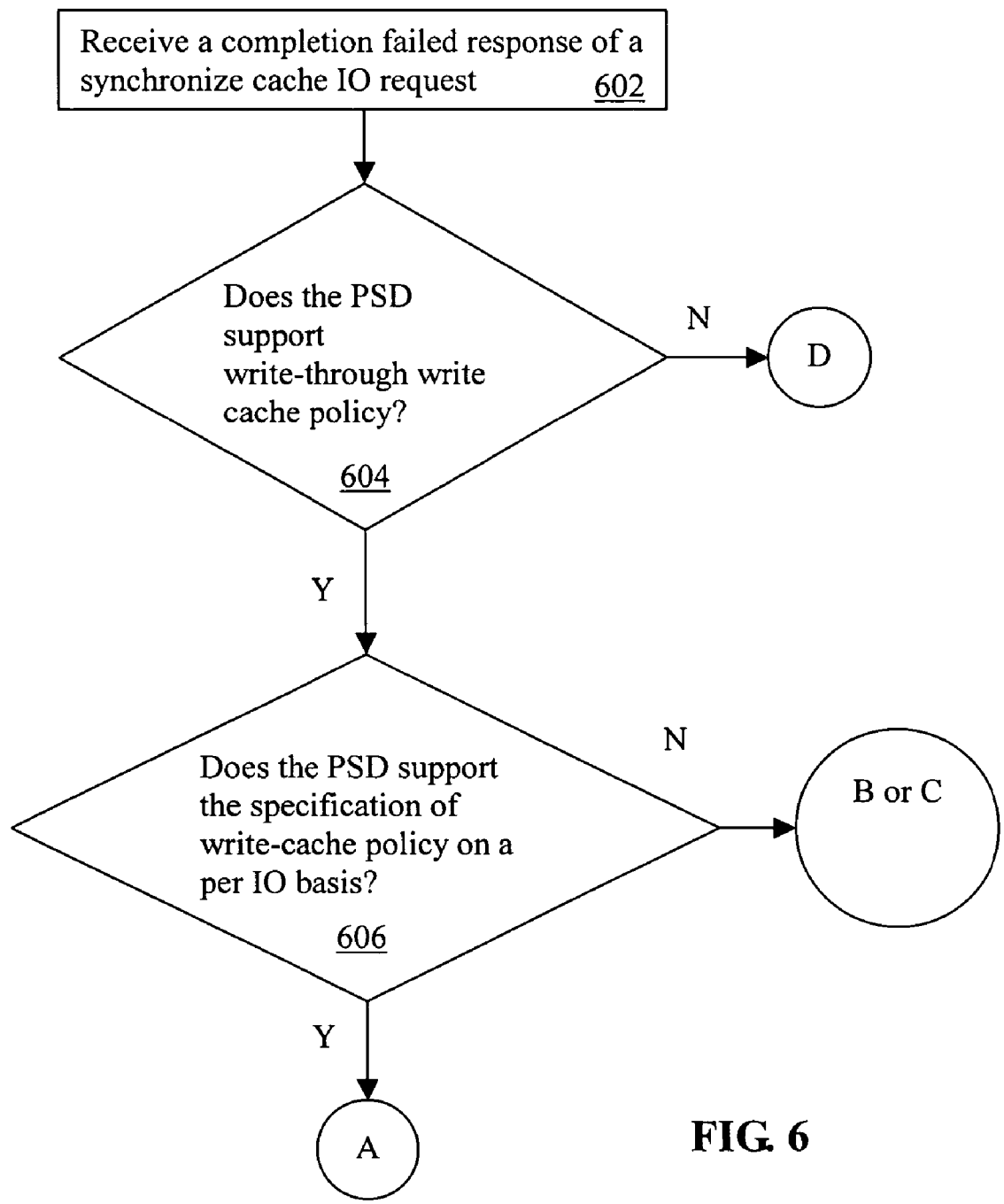
FIG. 6 is a flow chart showing a flow chart illustrating a mechanism incorporating the implementations depicted in FIGS. 5A, 5B, 5C, and 5D.

While all the above-mentioned mechanisms can be implemented separately, a mechanism incorporating all the considerations is illustrated in FIG. 6, which comprises the following steps: (1) the host entity receives a completion failed response of a synchronize cache IO request in step 602; (2) the host entity determines whether the PSD supports write-through write cache policy; (3) the host entity determines whether the PSD support the specification of write-cache policy on a per IO basis. Among them, the determinations A, B, C, and D go to step 504 of FIG. 5A, step 514 of FIG. 5B, step 534 of FIG. 5C, and step 554 of FIG. 5D, respectively.

In the current invention, write IO requests are entered into the Completion Pending PSD Cache Synchronization list after execution of the IO request by the PSD is complete as indicated by a successful IO request completion response from the PSD. At some later time, a synchronized cache IO request is sent to the PSD to make sure the data associated with the write IO requests entered into the Completion Pending PSD Cache Synchronization list is committed to the PSD media before write IO request entries are removed from the list and completion posted to the IO request source. Determination of the most appropriate time to issue the synchronized cache IO request to the PSD after accumulating write IO requests on the Completion Pending PSD Cache Synchronization list might be made based on several possible criteria.

One determination criteria (Determination Criteria #1) might be whether the number of entries on the Completion Pending PSD Cache Synchronization list exceeds a certain threshold (referred to here as the Maximum Completion Pending IO Request Count Threshold). If it does, then it may be deemed appropriate to synchronize the PSD cache by issuing a synchronized cache IO request to the PSD.

Another determination criteria (Determination Criteria #2) might be whether the total amount of data associated with the entries on the Completion Pending PSD Cache Synchronization list exceeds a certain threshold (referred to here as the Maximum Completion Pending IO Request Data Accumulation Threshold).

Another criteria (Determination Criteria #3) might be whether the time that has transpired since the first write IO request was entered into the Completion Pending PSD Cache Synchronization list exceeds a certain threshold (referred to here as the Maximum Write IO Request Latency Threshold).

Yet another (Determination Criteria #4) might be whether or not, for the time being, there are any more write IO requests to be issued by the IO source. If there are no more, then this might be considered an opportune time to perform a PSD cache synchronization and post entries on the Completion Pending PSD Cache Synchronization list back to the IO source as having completed.

The determination criteria mentioned above may be used independently, or may be used in combination to determine an appropriate time to initiate a PSD cache synchronization operation. The particular combination would typically depend on the characteristics of the implementation, environment and conditions that apply at the time. One common combination would be to combine all the above-mentioned criteria in an OR fashion, that is, if any of the criteria are met, a PSD cache synchronization operation might be performed. Another common combination adopted in an effort to achieve deterministic IO execution latency times would be the OR'ing Determination Criteria #3 and #4, such that if either criteria #3 or criteria #4 are met, then a PSD cache synchronization operation would be performed. Other combinations consisting of AND'ing, OR'ing and both the AND'ing and OR'ing of criteria might also be deemed the most appropriate for the particular configuration, operational state and IO stream characteristics. Different combinations of criteria with different associated thresholds might be adopted for different configurations, different operational states and/or different IO stream characteristics. For example, for IO streams that are substantially random in nature, criteria #1 would typically be considered the most appropriate to apply while for IO streams that are substantially sequential in nature, criteria #2 would typically be considered the better choice. Static combinations, however, under circumstances in which configuration, operations state or IO stream characteristics change significantly with time, might not exhibit optimal characteristics under all the various circumstances that may be encountered. In an effort to adapt to such changing factors, the determination of the most appropriate combination of criteria and even the thresholds associated with each criteria might be made dynamically and change as circumstances (e.g., system state, IO stream characteristics, etc.) change. An example of where it might prove beneficial to do this would be in a situation in which data buffering resources are limited such that if too many data buffers are tied up by virtue of being associated with write IO requests that currently are entered into Completion Pending PSD Cache Synchronization list, further processing of IOs might be hindered. To avoid this, the Maximum Completion Pending IO Request Count Threshold (if criteria #1 was being applied), Maximum Completion Pending IO Request Data Accumulation Threshold (if criteria #2 was being applied) or Maximum Write IO Request Latency Threshold (if criteria #3 was being applied) could be dynamically adjusted based on the amount of data buffering resources still available to process IOs. If it appeared that such resources were consumed to a point where smooth processing of IOs might soon be adversely affected, then these thresholds could be reduced to accelerate the process of freeing resources.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for committing cached data to storage media in a storage system including a host entity and a physical storage device (PSD), the method comprising the steps of:

the host entity issuing a write IO request to the PSD being in write-back caching mode to write associated data from a host memory to the PSD, wherein the PSD comprises the storage media, which is non-volatile storage media, and a cache memory, which is a volatile cache memory and used for containing the cached data sent from the host memory;

the host entity receiving a successful IO completion response associated with the write IO request from the PSD and recording an entry of the write IO request to a selected list;

the host entity issuing a synchronized cache IO request to the PSD to have the PSD commit cached data from the cache memory of the PSD to the storage media of the PSD;

the PSD responding a successful IO completion response of the synchronized cache IO request to the host entity;

when the host entity receives the synchronized cache IO request completion response from the PSD, the host entity extracting from the selected list the entry of the write IO request issued before the issuance of the synchronized cache IO request; and after the reception of the synchronized cache IO request completion response from the PSD, the host entity engaging completion processing of write IO request corresponding to the entry of the write IO request extracted.

2. The method of claim 1, wherein when the host entity receives the IO completion response of the synchronized cache IO request from the PSD, the host entity extracts from the selected list the entry of the write IO request issued before the reception of the synchronized cache IO request completion response.

3. The method of claim 1, further comprising the steps of:

the host entity queuing up any new write IO requests to write data from the host memory to the PSD pending completion of the synchronized cache IO request and waiting for completion of all write IO requests currently in the process of execution before the step of issuing the synchronized cache IO request to the PSD; and the host entity de-queuing the queued IO requests for execution after the host entity receiving the synchronized cache IO request completion response.

4. The method of claim 1, further comprising the step of the host entity selecting an alternate list as the selected list for receiving successful IO completion response after the step of issuing the synchronized cache IO request to the PSD.

5. The method of claim 1, further comprising the step of issuing a second synchronized cache IO request to the PSD before a first synchronized cache IO request completion response is received.

6. The method of claim 1, further comprising the step of, when the host entity receives an operation failed IO completion response of the synchronized cache IO request from the PSD, the host entity reissues a synchronized cache IO request to the PSD.

7. The method of claim 6, further comprising the step of, the host entity reissuing the write IO requests in the selected list before the host entity reissues the synchronized cache IO request to the PSD.

8. The method of claim 6, further comprising the step of determining whether the reissued synchronize cache operation succeeds, if the synchronized cache operation fails again, a recovery procedure is engaged.

9. The method of claim 6, further comprising the step of determining whether the reissued synchronize cache operation succeeds, if the synchronized cache operation fails again, the retried write IO requests is posted as having failed.

10. The method of claim 6, further comprising the step of determining whether the reissued synchronize cache operation succeeds, if the synchronized cache operation fails again, the host entity retries to reissue the synchronized cache IO request to the PSD.

11. The method of claim 10, further comprising the step of determining whether a maximum retry count is reached.

12. The method of claim 1, wherein when the host entity receives an operation failed IO completion response of the synchronized cache IO request from the PSD, the host entity requests the PSD to operate in write-through caching mode.

13. The method of claim 12, further comprising the step of, the host entity reissuing the write IO requests in the selected list after requesting the PSD to operate in write-through caching mode.

14. The method of claim 1, wherein when the host entity receives an operation failed IO completion response of the synchronized cache IO request from the PSD, the host entity reissues the write IO requests in the selected list by the following steps of:

(a) the host entity issuing the write IO request in the selected list;

(b) the host entity issuing a synchronized cache IO request after receiving a IO completion response of the write IO request;

(c) the host entity extracting the entry of the write IO request from the selected list after receiving a IO completion response of the synchronized cache IO request; and repeating the steps (a) through (c) until the selected list is empty.

15. The method of claim 14, further comprising the step of, if the IO completion response of the synchronize cache IO request indicates failure of the synchronize cache IO request, the retried write IO request is posted as having failed.

16. The method of claim 1, wherein when the host entity receives an operation failed IO completion response of the synchronized cache IO request from the PSD, the host entity extracting the entry of the write IO request from the selected list and reissuing each one with each write IO request individually requesting the PSD use write-through caching to process the request.

17. The method of claim 1, wherein when the host entity receives an operation failed IO completion response of a synchronized cache IO request from the PSD, the PSD is switched to write-through caching mode on a per-write-IO-request-retry basis.

18. The method of claim 17, further comprising the steps of, (a) the PSD being switched to write-through caching mode;

(b) the host entity issuing a write IO request in the selected list;

(c) the PSD being switched back to write-back caching mode and the host entity extracting the entry of the write IO request from the selected list after the host entity receives a IO completion response of the write IO request; and repeating the steps (a) through (c) until the selected list is empty.

19. The method of claim 1, wherein when the host entity receives an operation failed IO completion response of a synchronized cache IO request from the PSD, the PSD is switched to write-through caching mode entirely for the entire course of an error recovery process.

20. The method of claim 19, further comprising the steps of, (a) the PSD being switched to write-through caching mode;

(b) the host entity issuing write IO requests in the selected list;

(c) the host entity extracting the entry of the write IO requests from the selected list after the host entity receives a IO completion response of the write IO requests;

(d) the host entity repeating the steps (b) through (c) until the selected list is empty; and (e) the PSD being switched back to write-back caching mode.

21. The method of claim 1, wherein when the host entity receives an operation failed IO completion response of a synchronized cache IO request from the PSD, the host entity determines whether the PSD supports write-through write cache policy and determines whether the PSD support the specification of write-cache policy on a per IO basis, the host entity performs a recovery process in accordance with the determinations.

22. The method of claim 1, further comprising a timing determining step to determine a timing for issuing the synchronized cache IO request to the PSD before the step of issuing a synchronized cache IO request.

23. The method of claim 22, wherein the timing determining step comprises the steps of defining criteria for issuing the synchronized cache IO request, and determining the timing reached when the criteria is met.

24. The method of claim 23, wherein the criteria for issuing the synchronized cache IO request is that the number of entries on the selected list exceeds a first threshold.

25. The method of claim 23, wherein the criteria for issuing the synchronized cache IO request is that total amount of data associated with entries on the selected list exceeds a second threshold.

26. The method of claim 23, wherein the criteria for issuing the synchronized cache IO request is that the time transpired since the first write IO request was entered into the selected list exceeds a third threshold.

27. The method of claim 23, wherein the criteria for issuing the synchronized cache IO request is that there is a write IO request to be issued by the host entity for the time being.

28. The method of claim 23, wherein the criteria for issuing the synchronized cache IO request is that one of the following conditions is satisfied:
   (a) the number of entries on the selected list exceeds a first threshold;
   (b) total amount of data associated with entries on the selected list exceeds a second threshold;
   (c) the time that has transpired since the first write IO request was entered into the selected list exceeds a third threshold; and
   (d) for the time being, there is any write IO request to be issued by the host entity.

29. The method of claim 23, wherein the criteria for issuing the synchronized cache IO request is that one of the following conditions is satisfied:
   (a) the time that has transpired since the first write IO request was entered into the selected list exceeds a third threshold; and
   (b) there is any write IO request to be issued by the host entity for the time being.

30. The method of claim 23, wherein the criteria for issuing the synchronized cache IO request can be dynamically adjusted.

31. The method of claim 23, wherein the criteria for issuing the synchronized cache IO request can be automatically adjusted according to storage system states.

32. The method of claim 31, wherein the criteria is automatically adjusted in response to variation of data buffering resources of the storage system.

33. A storage system including a host entity and a physical storage device (PSD) to write data from the host entity to the PSD, the storage system comprising a PSD mechanism for committing cached data from a cache memory of the PSD to storage media of the PSD and performing the following steps:
   the host entity issuing a write IO request to the PSD being in write-back caching mode to write associated data from a host memory to the PSD, wherein the PSD comprises the storage media, which is non-volatile storage media, and the cache memory, which is a volatile cache memory and used for containing the cached data sent from the host memory;
   the host entity receiving a successful IO completion response associated with the write IO request from the PSD and recording an entry of the write IO request to a selected list;
   the host entity issuing a synchronized cache IO request to the PSD;
   the PSD responding a successful IO completion response of the synchronized cache IO request to the host entity;
   when the host entity receives the successful IO completion response of the synchronized cache IO request from the PSD, the host entity extracting from the selected list the entry of the write IO request issued before the issuance of the synchronized cache IO request; and
   after the reception of the synchronized cache IO request completion response from the PSD, the host entity engaging completion processing of write IO request corresponding to the entry of the write IO request extracted.

34. A computer system comprising a storage system connected thereto, the storage system including a host entity and a physical storage device (PSD) to write data from the host entity to the PSD, the computer system comprising a PSD mechanism for committing cached data from a cache memory of the PSD to storage media of the PSD and performing the following steps:
   the host entity issuing a write IO request to the PSD being in write-back caching mode to write associated data from a host memory to the PSD, wherein the PSD comprises the storage media, which non-volatile storage media, and the cache memory, which is a volatile cache memory and used for containing the cached data sent from the host memory;
   the host entity receiving at least one successful IO completion response associated with the write IO request from the PSD and recording an entry of the write IO request to a selected list;
   the host entity issuing a synchronized cache IO request to the PSD;
   the PSD responding a successful IO completion response of the synchronized cache IO request to the host entity;
   when the host entity receives a successful IO completion response of the synchronized cache IO request from the PSD, the host entity extracting from the selected list the entry of the write IO request issued before the issuance of the synchronized cache IO request; and
   after the reception of the synchronized cache IO request completion response from the PSD, the host entity engaging completion processing of write IO request corresponding to the entry of the write IO request extracted.

* * * * *